US012120207B2

(12) United States Patent
Harlalka et al.

(10) Patent No.: US 12,120,207 B2
(45) Date of Patent: Oct. 15, 2024

(54) MESSAGING PLATFORM FOR MANAGING OPERATIONAL DATA

(71) Applicant: Dell Products L.P., Round Rock, TX (US)

(72) Inventors: Bajrang Harlalka, Bangalore (IN); Ramakanth Kommu, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/121,176

(22) Filed: Mar. 14, 2023

(65) Prior Publication Data

US 2024/0314225 A1    Sep. 19, 2024

(51) Int. Cl.
*H04L 69/22* (2022.01)
*H04L 51/21* (2022.01)
*H04L 67/06* (2022.01)

(52) U.S. Cl.
CPC .............. *H04L 69/22* (2013.01); *H04L 51/21* (2022.05); *H04L 67/06* (2013.01)

(58) Field of Classification Search
None
See application file for complete search history.

(56) References Cited

U.S. PATENT DOCUMENTS

| 11,121,995 B2* | 9/2021 | Tyler | H04L 51/216 |
| 2010/0217806 A1* | 8/2010 | Khot | G06Q 10/06 709/204 |
| 2017/0289168 A1* | 10/2017 | Bar | H04L 63/1408 |
| 2018/0048595 A1* | 2/2018 | Dotan-Cohen | H04L 51/08 |
| 2021/0360064 A1* | 11/2021 | Dennis | H04L 67/1095 |

OTHER PUBLICATIONS

Dey et al., "Email Analytics for Activity Management and Insight Discovery", Jan. 24, 2014, IEEE, 2013 IEEE/WIC/ACM International Joint Conferences on Web Intelligence (WI) and Intelligent Agent Technologies (IAT) (vol. 1, pp. 557-564) (Year: 2014).*
Qamili et al., "An Intelligent Framework for Issue Ticketing System Based on Machine Learning", Oct. 1, 2018, IEEE, 2018 IEEE 22nd International Enterprise Distributed Object Computing Workshop (EDOCW) (2018, pp. 79-86) (Year: 2018).*
Seeburger AG, "Managed File transfer (MFT) Definition," https://www.seeburger.com/info/what-is-managed-file-transfer/, Accessed Mar. 3, 2023, 7 pages.
A. S. Gillis, "LDAP (Lightweight Directory Access Protocol)," https://www.techtarget.com/searchmobilecomputing/definition/LDAP, Accessed Mar. 3, 2023, 4 pages.

* cited by examiner

*Primary Examiner* — Davoud A Zand
(74) *Attorney, Agent, or Firm* — Ryan, Mason & Lewis, LLP (57) ABSTRACT

A method comprises receiving at least one message, wherein the at least one message comprises a header portion. The header portion comprises operational information about at least one device, and the operational information characterizes one or more operating characteristics of the at least one device. In the method, the at least one message is classified based at least in part on the header portion, and the at least one message is routed to a communication channel of a plurality of communication channels based at least in part on the classifying.

20 Claims, 6 Drawing Sheets

MESSAGING PLATFORM FOR MANAGING OPERATIONAL DATA

FIELD

The field relates generally to information processing systems, and more particularly to management of operational data in such information processing systems.

BACKGROUND

Following the purchase of, for example, computing, storage and/or network devices, enterprises may offer support for such products. To facilitate the provision of support, operational data from devices on a client side may be periodically sent to the device providers using, for example, automated business-to-business (B2B) systems and/or application program interface (API) calls. However, there may be some client locations where one or more devices are offline or are otherwise restricted from being connected to the providers due to, for example, security reasons or other factors. In these scenarios, the operational data may be sent via email or other types of messages to the providers using a network connected device. Current messaging platforms are not adequately equipped to process operational data, resulting in message loss and support failures.

SUMMARY

Embodiments provide a platform and techniques for management of messages comprising operational data.

For example, in one embodiment, a method comprises receiving at least one message, wherein the at least one message comprises a header portion. The header portion comprises operational information about at least one device, and the operational information characterizes one or more operating characteristics of the at least one device. In the method, the at least one message is classified based at least in part on the header portion, and the at least one message is routed to a communication channel of a plurality of communication channels based at least in part on the classifying.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
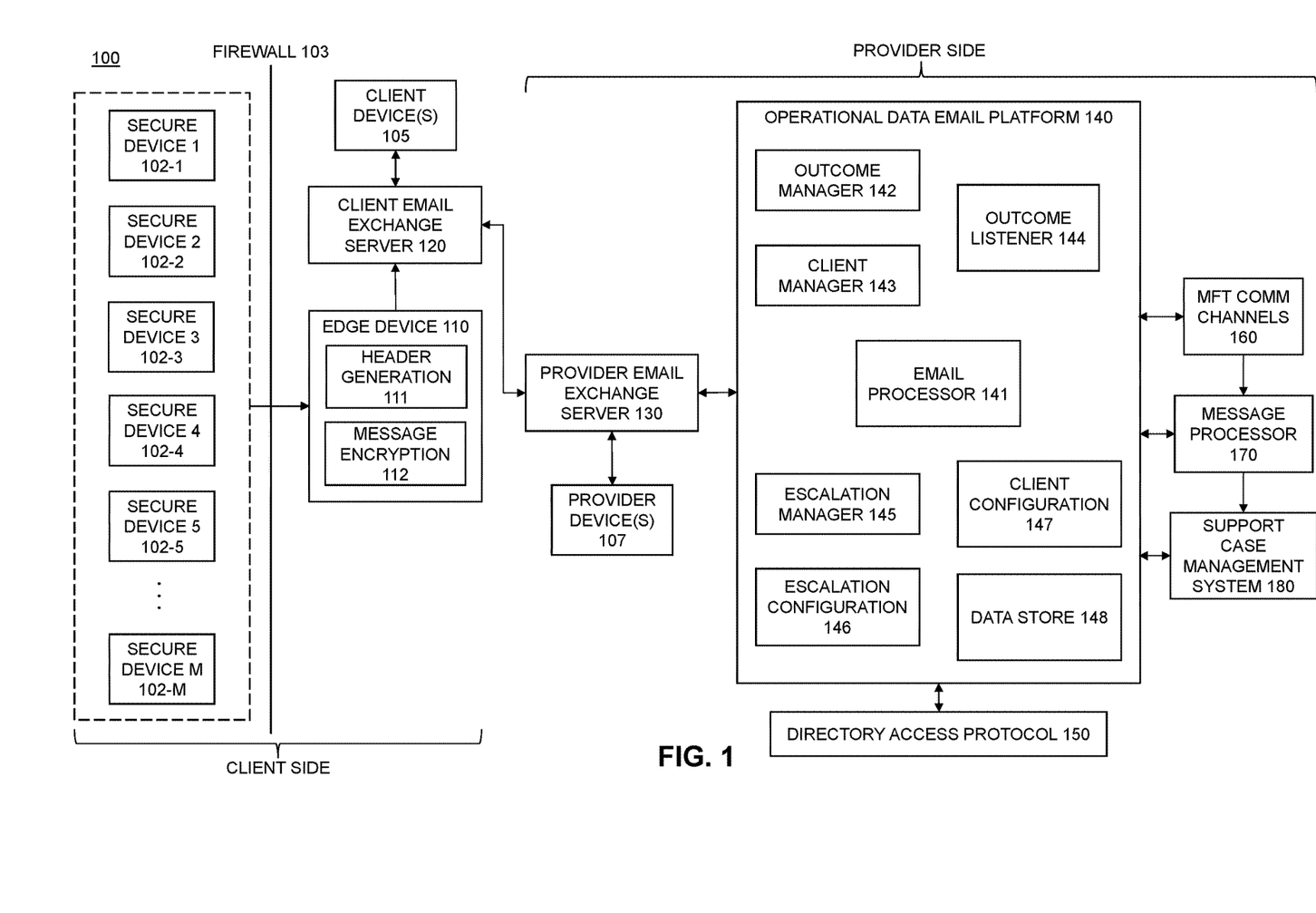
FIG. 1 depicts an information processing system comprising an operational data email platform for managing operational data received via email in an illustrative embodiment.

FIG. 1 depicts an information processing system 100 comprising a client side and a provider side. On the client side, a plurality of secure devices 102-1, 102-2, 102-3, 102-4, 102-5, . . . , 102-M (collectively "secure devices 102") are protected by a firewall 103, and connected to an edge device 110. The secure devices 102 are offline or are otherwise restricted from being connected to the Internet or other network due to, for example, security reasons or other factors. The edge device 110 is connected to a client email exchange server 120, which is connected to one or more client devices 105. A provider side includes a provider email exchange server 130, one or more provider devices 107, an operational data email platform 140, a directory access protocol 150, a plurality of managed file transfer (MFT) communication channels 160, a message processor 170 and a support case management system 180.

The client email exchange server 120 is connected to the provider email exchange server 130 over one or more networks (not shown). The networks comprise at least a portion of a global computer network such as the Internet, although other types of networks can be part of the networks, including a wide area network (WAN), a local area network (LAN), a satellite network, a telephone or cable network, a cellular network, a wireless network such as a WiFi or WiMAX network, or various portions or combinations of these and other types of networks. The networks comprise combinations of multiple different types of networks each comprising processing devices configured to communicate using Internet Protocol (IP) or other related communication protocols.

In a non-limiting illustrative example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In non-limiting embodiments, the secure devices 102, one or more client devices 105, one or more provider devices 107, edge device 110, client email exchange server 120, provider email exchange server 130 and operational data email platform 140 may comprise, for example, desktop, laptop or tablet computers, servers, storage devices, mobile telephones, Internet of Things (IoT) devices or other type of processing devices. Such devices are examples of what are more generally referred to herein as "processing devices." Some of the processing devices are also generally referred to herein as "computers." The secure devices 102, one or more client devices 105, one or more provider devices 107, edge device 110, client email exchange server 120, provider email exchange server 130 and operational data email platform 140 may also or alternately comprise virtualized computing resources, such as virtual machines (VMs), containers, etc. The secure devices 102, one or more client devices 105, one or more provider devices 107, edge device 110, client email exchange server 120, provider email exchange server 130 and operational data email platform 140 in some embodiments comprise a computer associated with a particular company, organization or other enterprise.

The terms "user," "customer," "client" or "administrator" herein are intended to be broadly construed so as to encompass numerous arrangements of human, hardware, software or firmware entities, as well as combinations of such entities. At least a portion of the available services and functionalities provided by the edge device 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments. Although not explicitly shown in FIG. 1, one or more input-output devices such as keyboards, displays or other types of input-output devices may be used to support one or more user interfaces to the secure devices 102, one or more client devices 105, one or more provider devices 107, edge device 110, client email exchange server 120, provider email exchange server 130 and operational data email platform 140.

In illustrative embodiments, the edge device 110, client devices 105 and provider devices 107 include an email client such as, for example, Microsoft® Outlook®. As explained in more detail herein, the email clients may each include a plug-in or add-on installed on the email clients to configure settings applied by the operational data email platform 140. Alternatively, the original programming of the email clients may be designed to include functionality for configuring settings applied by the operational data email platform 140.

As noted herein above, the client email exchange server 120 and provider email exchange server 130 are connected to each other over one or more networks. The client email exchange server 120 and provider email exchange server 130 may include SMTP (Simple Mail Transfer Protocol) servers, domain-name servers, web servers, application servers, etc. or other types of servers which provide processes used by the email clients. For example, the client email exchange server 120 and provider email exchange server 130 may be web servers, application servers, incoming and outgoing mail servers, which provide web-based or other types of applications, services or other functionality for the email clients. In some embodiments, the client email exchange server 120 and provider email exchange server 130 are part of a cloud computing network providing services to users of the email clients. The services, applications, functionality or more generally processes provided or otherwise made available to email clients by client email exchange server 120 and provider email exchange server 130 can vary in complexity. It is to be understood that the number of email clients and servers is merely illustrative and may be more than what is described. Additionally, although the illustrative embodiments are described in connection with email, the embodiments are not necessarily limited thereto, and may apply to other types of messaging techniques and platforms such as, for example, extensible messaging and present protocol (XMPP), message queuing telemetry transport (MQTT) protocol, rich communication services (RCS) protocol, short message service (SMS), multimedia messaging service (MMS), etc.

As noted herein above, there may be some client locations where one or more devices (e.g., secure devices 102) are offline or are otherwise restricted from being connected to providers. In accordance with illustrative embodiments, the secure devices 102 are connected to an edge device 110. In one or more embodiments, the edge device 110 is a provider edge device, but the embodiments are not necessarily limited thereto. As can be seen in FIG. 1, the edge device 110 comprises a header generation layer 111 and a message encryption layer 112. The edge device 110 receives operational data from one or more of the secure devices 102. The operational data comprises operational information characterizing one or more operating characteristics of a device. As used herein "operating characteristics" include, but are not necessarily limited to, device status information, device operating mode and/or device operating performance. Some non-limiting examples of operational information include alerts and/or information about the functioning and/or health of the one or more secure devices 102 indicating, for example, whether a device is powered on, whether a device is in a particular operating mode, device failure data, data identifying a lack of device responsiveness, and/or device usage, temperature, performance state (p-state), throttling, capacity, latency, throughput and/or frequency data. As used herein, a "device" is to be broadly construed, and can refer to various hardware devices and/or software components and/or parts thereof such as, but not necessarily limited to, computers, servers, host devices, storage devices (e.g., hard drives), batteries, chassis, display panels, motherboards, controllers, cards, heat sinks, fans, fan assemblies, processors, ports, host bus adaptors (HBAs), speakers, keyboards, memories, switches, networks or other elements of a computing environment that may fail or malfunction. The operational information can be included in one or more logs, such as, for example, a lifecycle (LC) log and/or a system event log (SEL).

In illustrative embodiments, the operational data is sent to the edge device 110 from respective ones of the secure devices 102 in a message format such as, but not necessarily limited to, one or more emails from a given one of the secure devices 102 to the edge device 110. Although the secure devices 102 are offline and protected by a firewall 103, the secure devices 102 are configured to exchange data and/or messages with the edge device 110 through, for example, wired and/or wireless local/private network connections that are secure.

Upon receipt of respective ones of a plurality of messages from the secure devices 102, the header generation layer 111 reads and analyzes operational and identifying data in the messages and generates a header portion for each message. For example, based on the operational data in a message, the header portion a given message may specify operational information such as "fatal device failure," "device not responding," "consumption metering," "high CPU usage," "device health information," etc. Additionally, the header portion includes customer/client identifying information (e.g., email address, customer number, name, etc.). Referring, for example, to the operational flow 300 in FIG. 3, at block 301 in the "generate" portion, the edge device (e.g., edge device 110) generates header values for emails.

The message encryption layer 112 encrypts the respective messages from the secure devices 102 (e.g., emails) using a designated encryption algorithm. For example, in some embodiments, the provider's encryption logic is used to encrypt the respective messages. The encrypted messages including the generated header portions are transmitted to the client email exchange server 120 and then to the provider email exchange server 130 over one or more networks as described herein. The message processor 170 on the provider side decrypts incoming messages from the client side.

As can be seen in FIG. 1, the operational data email platform 140 comprises an email processor 141, an outcome manager 142, a client manager 143, an outcome listener 144, an escalation manager 145, an escalation configuration layer 146, a client configuration layer 147 and a data store 148. On a provider side, upon receipt of an email message from the provider email exchange server 130, referring to block 302 of FIG. 3, the email processor 141 reads the header entries and classifies the message based on the header portion. For example, the classifying comprises defining a severity level of the message. In more detail, a severity level is based on whether the operational information indicates a failure or non-responsiveness of a device or component, different usage patterns and/or collection of operational metrics of devices or components. For example, highest severity level (referred to herein as "critical") corresponds to, for example, a failure or non-responsiveness of a device or component. A next level below a highest severity level (referred to herein as "Important") corresponds to, for example, different usage patterns or changes in device or component operation that may lead to a problem or failure. A further lower severity level (referred to herein as "Informational") corresponds to, for example, collection of operational metrics of devices or components. Although three severity levels are described herein, the embodiments are not necessarily limited thereto, and there may be more or less than three severity levels in which a message can be classified.

Figure 3:
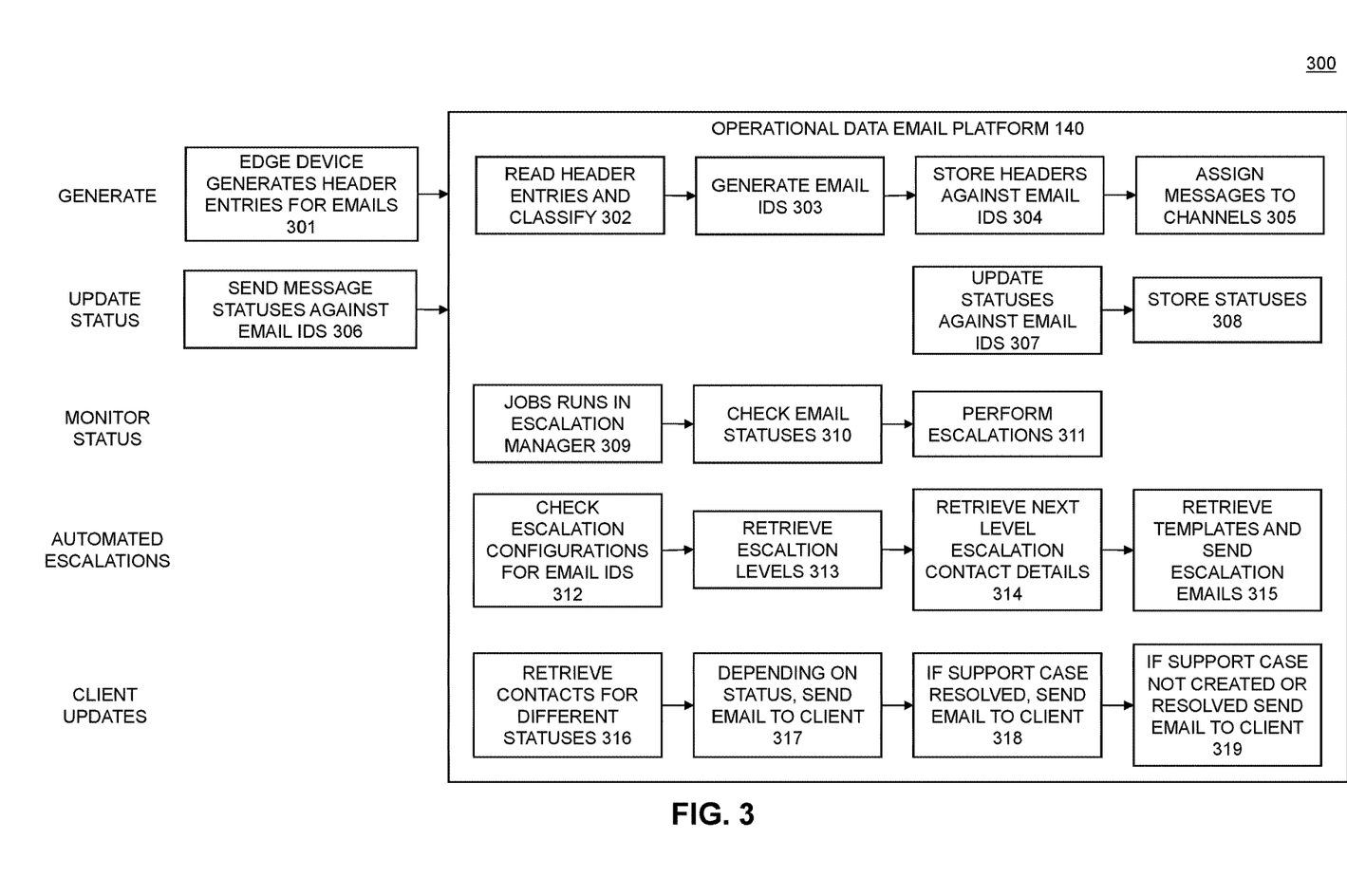
FIG. 3 depicts an operational flow diagram illustrating management of operational data received via email in an illustrative embodiment.

Referring to blocks 303 and 304 in FIG. 3, the email processor 141 generates a unique identifier for the message and stores the header portion in correspondence with the unique identifier in the data store 148. In one or more embodiments, whether a unique identifier is generated for a given message and the header portion is stored in the data store 148 are based on the severity level of the message, and whether the severity level corresponds to further action. As explained in more detail herein, the further action includes, for example, creating a support case to address any device or component performance issues noted in the message and/or generating correspondence to clients and/or administrators regarding efforts to address the performance issues.

Referring to block 305 in FIG. 3, depending on the classification and corresponding severity level, the email processor 141 routes a message to a particular communication channel designated to correspond a particular severity level. For example, a plurality of managed file transfer (MFT) communication channels 160 (e.g., Channels 1, 2, 3 and 4) each correspond to one of a plurality of severity levels. The embodiments are not necessarily limited to communication channels employing MFT protocols, and other file transfer protocols may be used.

In a non-limiting operational example, header portions specifying "fatal device failure" and "device not responding" are classified as "critical" and routed to communication channel 1. Header portions specifying "consumption metering" and "increased CPU usage" are classified as "important" and routed to communication channels 2 or 3. A header portion specifying "device health information" is classified as "informational" and routed to communication channel 4.

As explained in more detail herein, depending on the severity level, a support case management system 180 may create a support case for technical support personnel and/or automated compute resources to address any performance issues with a device or component corresponding to a given message. For example, in an illustrative embodiments, in the case of a "critical" severity level, the support case management system 180 will create a support case, but for "important" or "informational" severity levels, the support case management system 180 will not create a support case.

Figure 2A:
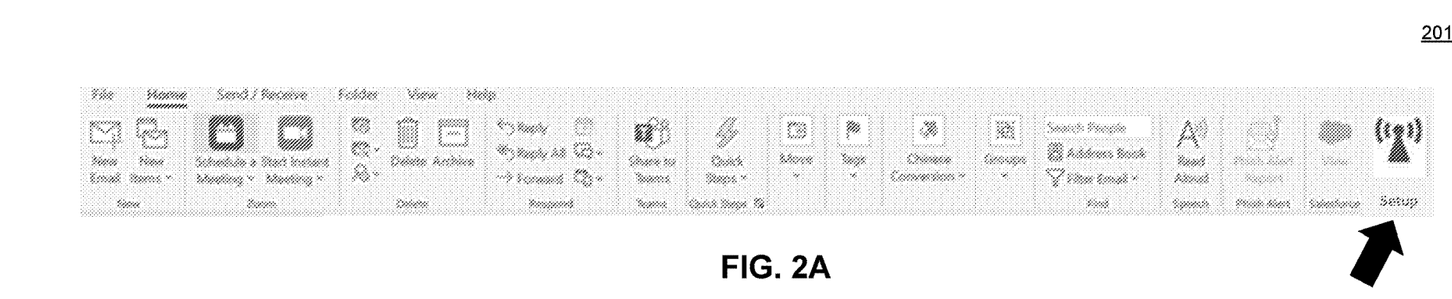
FIG. 2A depicts a feature for configuring operational data email settings added to a user interface of an email application in an illustrative embodiment.
Figure 2B:
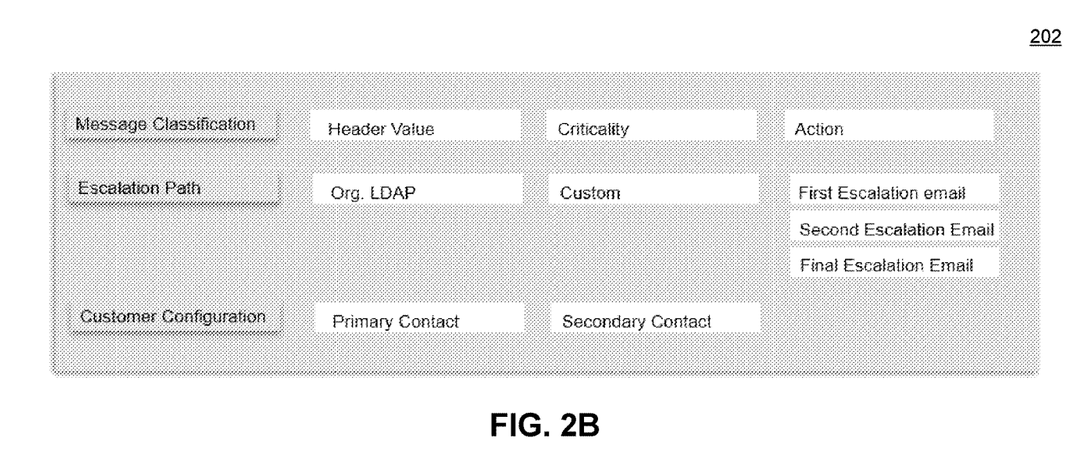
FIG. 2B depicts a dialog box for configuring operational data email settings via an email application in an illustrative embodiment.

In FIG. 2A, the user interface 201, as shown by the arrow, a feature for configuring operational data email settings is depicted. The "setup" feature comprises an icon added to a user interface 201 of an email application (e.g., Microsoft® Outlook®, but not necessarily limited thereto). Referring to FIG. 2B, a dialog box 202 for configuring operational data email settings via an email application is shown. For example, once the icon from the user interface 201 is selected, the dialog box 202 will appear on the screen of a user device (e.g., client device 105 or provider device 107). The dialog box 202, or other similar user interface with fillable fields, is used to configure which header values will lead to certain message classifications. For example, as noted hereinabove, some header values (also referred to herein as "header entries") result in "critical," "important" or "informational" classifications of messages. For example, the email processor 141 reads the header portions to apply designated classifications and take certain actions (e.g., route to designated communication channel, create a support case, etc.) determined as per the dialog box 202. The header portion of a message can be read and analyzed before a message is decrypted.

The dialog box 202 or other similar user interface is further used to configure the escalation settings for incoming messages, and how and when customers (e.g., clients) are notified about message statuses (e.g., whether a support case was created, resolved and/or whether there has been a delay in addressing the issues set forth in a given message). In illustrative embodiments, a directory access protocol 150 (e.g., lightweight directory access protocol (LDAP)) or other software protocol may be used by the operational data email platform 140 to locate, validate and/or authenticate users and devices. The directory access protocol 150 provides and/or validates, for example, domains, IP addresses, email addresses, usernames, passwords, authentication credentials, device identifiers, etc. for users and devices.

In an illustrative embodiment, via the dialog box 202, escalation paths are set in the case of "critical" messages. The escalation settings may be set by and stored in the escalation configuration layer 146. Referring to the dialog box 202, the paths can be set in accordance with an organizational LDAP, where escalation levels (e.g., first, second and final) are designated and corresponding email addresses are specified. In addition, time differences for different levels of escalations are identified. For example:

First Escalation—John_Doe@abc.com—2 days
Second Escalation—Jane_Doe@abc.com—3 days
Third (Final) Escalation—John_Smith@abc.com—5 days In more detail, in accordance with the above settings, for a critical message, if a support case is not created by the support case management system 180 within 2 days of the receiving the message and/or the critical classification, the escalation manager 145 automatically reads the escalation path (levels), identifies the first escalation point and sends a predefined email about the lack of action on the message to the specified email address (e.g., John_Doe@abc.com). If no support case has been created within 3 days, the escalation manager 145 identifies the second escalation point and sends a predefined email about the lack of action on the message to the specified email address (e.g., Jane_Doe@abc.com). Similarly, if no support case has been created within 5 days, the escalation manager 145 identifies the third (final) escalation point and sends a predefined email about the lack of action on the message to the specified email address (e.g., John_Smith@abc.com). Escalation paths are not necessarily limited to the failure to create a support case, and may also be defined for other failures such as, for example, a failure to address or resolve a support case or performance issue. In illustrative embodiments, the escalation manager 145 receives notifications from the outcome manager 142 via an outcome listener 144 about whether support cases have been created, addressed or resolved. The email addresses specified in the escalation paths may correspond to provider personnel who can address the lack of action. The provider personnel can receive the predefined emails via one or more provider devices 107.

In an illustrative embodiment, via the dialog box 202, customer notification settings can be defined by and stored in a client configuration layer 147. For example, for a specific header value or classification, a user can define, via the dialog box 202, customer (client) primary and secondary email addresses for status notifications of support cases, so that a client manager 143 can send message statuses (e.g., critical message statuses) to clients via, for example, client devices 105.

Referring back to blocks 303 and 304 of the operational flow 300, the email processor 141 generates a unique identifier for a message and stores the header portion in correspondence with the unique identifier in the data store 148. In one or more embodiments, whether the unique identifier is generated for a given message and the header portion is stored in the data store 148 can be based on whether the message type (e.g., "critical") or header entry is configured for escalation and/or customer notifications. Referring to the "update status" section of the operational flow 300 (blocks 306, 307 and 308), the message statuses are sent, tracked and organized according to the unique identifiers (email IDs) for each message. The statuses are updated by the escalation manager 145 via the outcome manager 142 and outcome listener 144 in correspondence with the email IDs and stored in correspondence with the email IDs in the data store 148. The statuses may comprise, but are not necessarily limited to, "support case created," "support case being addressed," "support case resolved" and/or "support case not needed."

In illustrative embodiments, once a support case is created by the support case management system 180, the message processor 170 sends a notification to the escalation manager 145 with a unique identifier (email ID). The notification may comprise an API communication. For example, an API is exposed to update message status from systems that are external to the operational data email platform 140. The escalation manager 145 updates the status for that email and flags the email with a "support case created" tag, and transmits a notification to the client manager 143 with the updated status. The client manager 143 checks the customer configuration as defined by, for example, a user via the dialog box 202. If contacts are defined for the classification and/or status of the message, a message (e.g., email) is automatically created and sent to the defined contacts. The message may indicate, for example, that the support case has been created and will be addressed soon.

In illustrative embodiments, if a message is classified as critical by the email processor 141, the email processor 141 notifies the escalation manager 145 of the classification. However, following classification, if a message is lost (e.g., after being routed to a communication channel and/or to the message processor 170) or if a support case is not created by the support case management system 180 for the message, the escalation manager 145 will not receive notifications that a support case been created or may not receive any further notifications for this message. In this case, based on the lack of notifications, the escalation manager 145 determines that there are problems with the processing of the message and performs escalation operations in accordance with designated configurations. For example, referring to the monitor status section of FIG. 3 (blocks 309, 310 and 311), the escalation manager 145 will run operations (jobs) to check the statuses of respective messages to determine whether any notifications have been received for the respective messages. If no notifications are received for a given message (e.g., a critical message), depending on the escalation configurations (e.g., defined via the dialog box 202), the escalation manager 145 may perform escalation tasks as per the defined escalation configurations. As noted herein above, the escalation configurations may be stored in the escalation configuration layer 146 and/or the data store 148. The operations (jobs) to check the statuses of respective messages may run at designated time intervals (e.g., each day, every 12 hours, every 6 hours, every hour, etc.)

In a non-limiting operational example, each day a job may run in the escalation manager 145 to see if any violations of an escalation configuration for a specific type of message occur. For example, in keeping with the escalation settings discussed hereinabove, for a critical message, if the escalation manager 145 does not receive a "support case created" notification in a first period of time (e.g., 2 days), the escalation manager 145 automatically creates an email and sends the email to the first escalation contact point (e.g., John_Doe@abc.com). If the escalation manager 145 does not receive the notification in a second period of time (e.g., 3 days), the escalation manager 145 automatically creates and sends a second escalation email to the second escalation contact point (e.g., Jane_Doe@abc.com), and if the escalation manager 145 does not receive the notification in a third period of time (e.g., 5 days), the escalation manager 145 automatically creates and sends a third escalation email to the third escalation contact point (e.g., John_Smith@abc.com).

For example, referring to the automated escalations section of FIG. 3 (blocks 312, 313, 314 and 315), upon not receiving "support case created" notification and/or not receiving any notifications for a given message and determining that there is a problem with the processing of the given message (e.g., determining that a support case has not been created), the escalation manager 145 checks the escalation configurations for the email ID corresponding to the given message (block 312). Referring to blocks 313 and 314, the escalation manager retrieves the escalation levels and, depending on how much time has passed (e.g., 2 days, 3 days or 5 days), retrieves the next level escalation contact details. Then, referring to block 315, the escalation manager 145 retrieves an email template for the particular escalation level and sends the escalation email to the appropriate contact. Email templates may be stored in, for example, escalation configuration layer 146 and/or the data store 148, and include language explaining the lack of action (e.g., failure to create a support case to address one or more performance issues).

In some scenarios, the escalation manager 145 may receive a "support case created" notification, but not a "support case resolved" notification within a configured time. In this situation, there may be an escalation configuration based on the receipt of the support case created" notification and a failure to receive a "support case resolved" notification, and the escalation manager 145 proceeds with contacting the designated personnel based on the pre-determined escalation configuration. The escalation points of contact (e.g., providers via provider devices 107) can reply to the escalation messages with messages outlining their approaches to resolving the issue such as, for example, messages (e.g., emails) specifying that the matter has been addressed, which will cause the escalation manager 145 to remove that escalation from the configuration.

Referring to the client updates section of the operational flow 300 in FIG. 3, at block 316, depending on a particular status of a message (e.g., "support case created," "support case being addressed," "support case resolved," "support case not needed," etc.) the client manager 143 retrieves the corresponding contact information (e.g., client email address) from the client configuration layer 147 and/or the data store 148. As noted hereinabove, such contacts based on different statuses can be configured through the dialog box 202. Referring to block 317, depending on the status, a message (e.g., email) is generated and sent by the client manager 143 to the designated client. For example, in blocks 318 and 319, responsive to a support case being resolved or to a support case not being created or resolved, emails are generated and sent by the client manager 143 to the designated clients for each status.

According to one or more embodiments, the data store 148, databases, caches and other data repositories referred to herein can be configured according to a relational database management system (RDBMS) (e.g., PostgreSQL). In some embodiments, the data store 148, databases, caches and other data repositories referred to herein are implemented using one or more storage systems or devices associated with the operational data email platform 140. In some embodiments, one or more of the storage systems utilized to implement the data store 148, databases, caches and other data repositories referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The operational data email platform 140 in the embodiment of FIG. 1 is assumed to be implemented using at least one processing device. Each such processing device generally comprises at least one processor and an associated memory, and implements one or more functional modules for controlling certain features of the operational data email platform 140.

At least portions of the operational data email platform 140 and the elements thereof may be implemented at least in part in the form of software that is stored in memory and executed by a processor. The operational data email platform 140 and the elements thereof comprise further hardware and software required for running the operational data email platform 140, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

It is assumed that the operational data email platform 140 and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the operational data email platform 140, and the elements thereof can each be implemented in the form of one or more LXCs running on one or more VMs. Other arrangements of one or more processing devices of a processing platform can be used to implement the operational data email platform 140, as well as other elements of the operational data email platform 140. Other portions of the system (e.g., system 100) can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the email processor 141, outcome manager 142, client manager 143, outcome listener 144, escalation manager 145, escalation configuration layer 146, client configuration layer 147, data store 148 and other elements of the operational data email platform 140, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the operational data email platform 140 can be offered to cloud infrastructure customers or other users as part of FaaS, CaaS and/or PaaS offerings.

Figure 4:
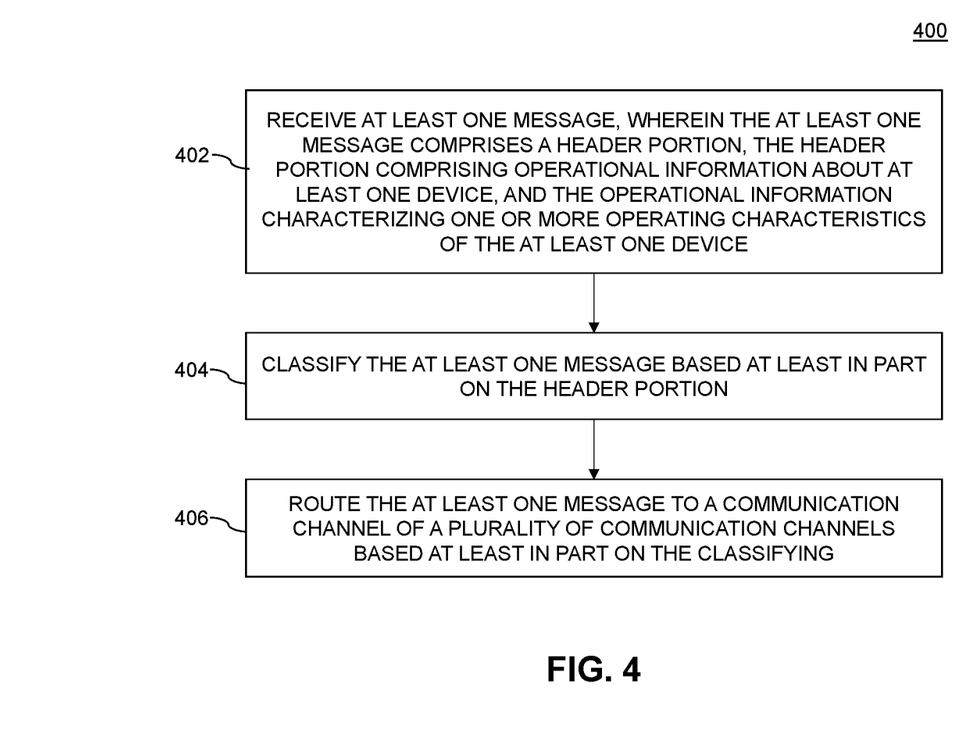
FIG. 4 depicts a process for management of operational data received via messages according to an illustrative embodiment.

The operation of the information processing system 100 will now be described in further detail with reference to the flow diagram of FIG. 4. With reference to FIG. 4, a process 400 for management of operational data received via messages as shown includes steps 402 through 406, and is suitable for use in the system 100 but is more generally applicable to other types of information processing systems comprising operational data email platform 140.

In step 402, at least one message is received, wherein the at least one message comprises a header portion. The header portion comprises operational information about at least one device and the operational information characterizes one or more operating characteristics of the at least one device. In an illustrative embodiment, the at least one message comprises an email message.

In step 404, the at least one message is classified based at least in part on the header portion. In step 406, the at least one message is routed to a communication channel of a plurality of communication channels based at least in part on the classifying. In illustrative embodiments, the plurality of communication channels comprise MFT communication channels.

According to one or more embodiments, the classifying comprises defining a severity level of the at least one message based at least in part on the header portion. The plurality of communication channels may respectively correspond to one of a plurality of severity levels.

As noted herein above, the edge device 110, which may be a provider edge device, analyzes the content of the at least one message, and generates the header portion based at least in part on the analysis.

In illustrative embodiments, the operational information identifies one or more performance issues with the at least one device. For example, the operational information includes alerts and/or information about the functioning and/or health of the one or more secure devices 102 indicating, for example, device or component failure data, data identifying a lack of device or component responsiveness, and/or device or component usage, temperature, p-state, throttling, capacity, latency, throughput and/or frequency data.

In some embodiments, the escalation manager 145 determines whether one or more support cases have been created to address the one or more performance issues. In response to a determination of a failure to create the one or more support cases, the escalation manager 145 generates a communication (e.g., email or other type of message) identifying the failure, and transmits the communication to at least one user device (e.g., provider device 107) as per escalation configurations. The timing for generating the communication identifying the failure (e.g., 2 days, 3 days, 5 days) is controlled based at least in part on whether the at least one message has been classified with a particular message classification (e.g., whether the message has been classified as "critical").

In some embodiments, the client manager 143, in response to a determination that the one or more support cases have been created, generates a communication (e.g., email or other type of message) identifying the creation, and transmits the communication to at least one user device (e.g., client device 105) as per client communication configurations. In some embodiments, the client manager 143 and/or escalation manager 145, in response to a determination that the one or more support cases have been created, and that the one or more support cases have failed to be resolved, generates a communication (e.g., email or other type of message) identifying the failure, and transmits the communication to at least one user device (e.g., client and/or provider device 105, 107) as per client communication and/or escalation configurations.

In one or more embodiments, the operational data email platform 140 receives a notification that one or more support cases have been created to address one or more performance issues, and exposes an API to generate a status of the at least one message indicating that the one or more support cases have been created. In an illustrative embodiment, a unique identifier for at least one message is generated, and the header portion of the at least one message is stored (e.g., in data store 148) in correspondence with the unique identifier.

As explained hereinabove, one or more contacts (e.g., client email addresses) can be designated (e.g., via dialog box 202) for a particular message classification. For example, if a message is classified as "critical," one or more client contacts can be designated to receive communications about the status of the message. If a message is classified under a different classification (e.g., "important," "informational," etc.) the same or different contacts can be designated to receive communications for the message. In accordance with the embodiments, the client and/or escalation manager 143, 145 identifies whether a message has been classified with a particular message classification and routes one or more communications corresponding to the message to the one or more contacts that have been designated for the particular classification.

It is to be appreciated that the FIG. 4 process and other features and functionality described above can be adapted for use with other types of information systems configured to manage operational data received via messages in an operational data email platform 140 or other type of platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a platform for managing operational data received via messages as disclosed herein can provide a number of significant advantages relative to conventional arrangements. For example, the embodiments provide a technical solution whereby incoming encrypted messages (e.g., email messages) are classified based on generated message headers. The messages include, for example, operational data about one or more devices that may be having performance issues. Advantageously, escalation processes are configured and executed for specific categories of messages when the performance issues have not been addressed. The escalation processes send notifications to administrative personnel when actions have not been taken to resolve performance issues. In addition, notifications are automatically sent to clients (customers) with status updates for received messages. Such status updates may include information regarding whether a support case was created, is being addressed or has been resolved in connection performance issues identified in a message.

Current email systems transfer messages to a file store, and custom code for handling messages with operational data must be built. Under conventional approaches, email servers are not equipped to handle operational data operations, which leads to high code maintenance overhead, increased cost and message loss. Advantageously, the illustrative embodiments provide a messaging system where messaging applications and exchange servers are configured to manage device operational data and remedial operations for client-side devices. The management is performed based on messages being sent to a provider-side (e.g., provider cloud platforms), wherein the messages include operational data of the client-side devices. The embodiments provide user interfaces for configuration of escalation paths and automatic message transmission to designated users when actions have not been taken to resolve device performance issues. The embodiments further provide user interfaces for configuration of different customer contacts and enable automatic status updates about remedial actions taken to address performance issues to be sent from exchange servers to the designated customer contacts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the operational data email platform 140 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data packet conversion platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
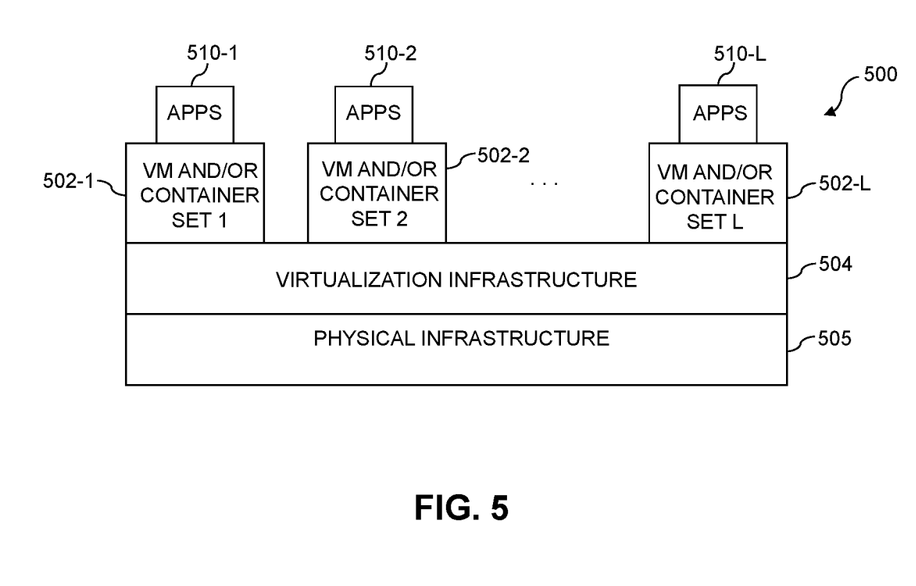
FIGS. 5 and 6 show examples of processing platforms that may be utilized to implement at least a portion of an information processing system according to illustrative embodiments.
Figure 6:
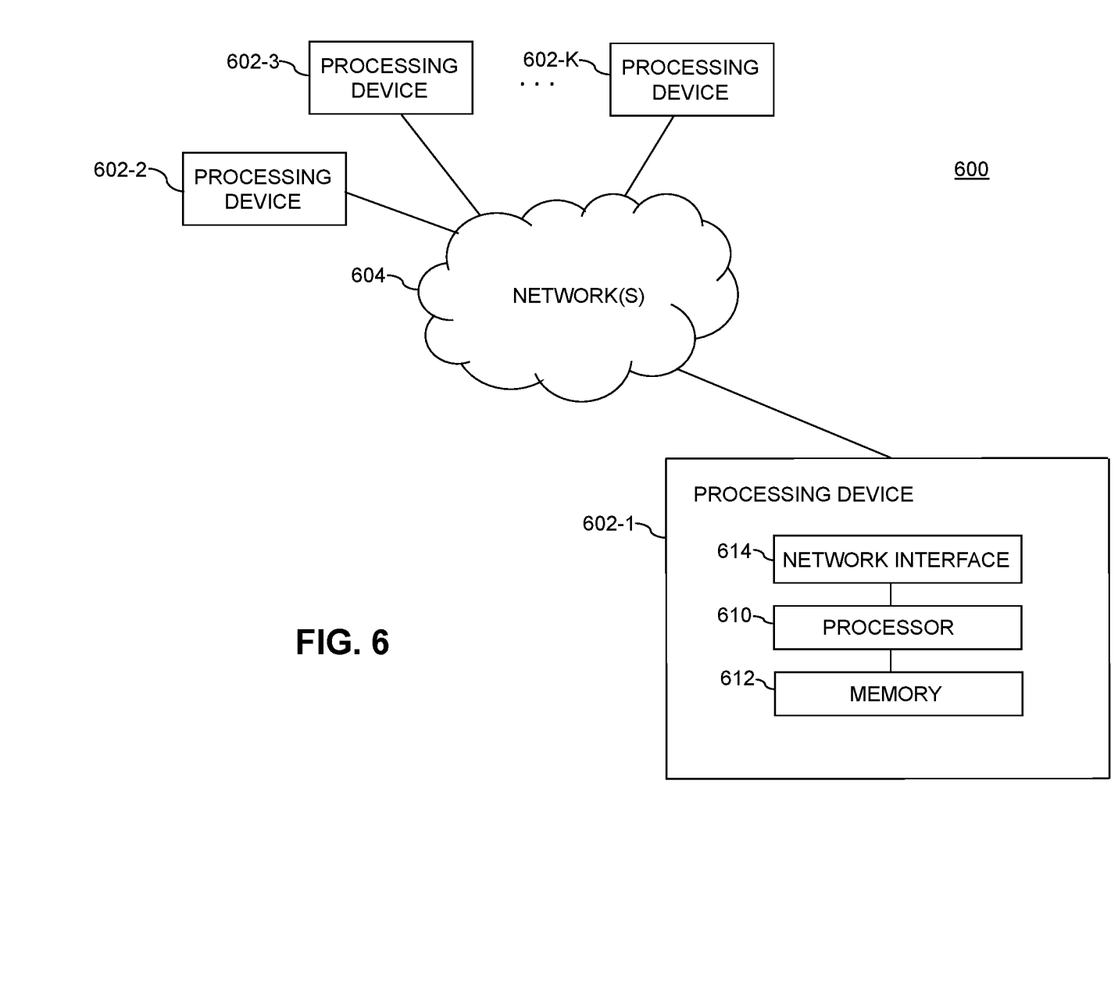

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a CPU, a GPU, a TPU, a VPU or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the operational data email platform 140 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and operational data messaging platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving at least one message, wherein the at least one message comprises a header portion, the header portion comprising operational information about at least one device, and the operational information characterizing one or more operating characteristics of the at least one device;

classifying the at least one message based at least in part on the header portion;

routing the at least one message to a communication channel of a plurality of communication channels based at least in part on the classifying;

responsive to the routing, monitoring for at least one of creation and resolution of one or more support cases to address one or more performance issues relating to the operational information of the header portion; and automatically generating and transmitting at least one additional message in accordance with at least one configured escalation setting based at least in part on results of the monitoring;

wherein the steps of the method are executed by at least one processing device operatively coupled to a memory.

2. The method of claim 1 wherein the at least one message comprises an email message.

3. The method of claim 1 wherein the plurality of communication channels comprise managed file transfer communication channels.

4. The method of claim 1 wherein the classifying comprises defining a severity level of the at least one message based at least in part on the header portion, and wherein the plurality of communication channels respectively correspond to one of a plurality of severity levels.

5. The method of claim 1 further comprising:
analyzing content of the at least one message; and
generating the header portion based at least in part on the analysis.

6. The method of claim 1 wherein the operational information identifies one or more performance issues with the at least one device.

7. The method of claim 6 further comprising determining whether one or more support cases have been created to address the one or more performance issues.

8. The method of claim 7 further comprising:
generating, in response to a determination of a failure to create the one or more support cases, a communication identifying the failure; and
transmitting the communication to at least one user device.

9. The method of claim 8 wherein timing for generating the communication identifying the failure is controlled based at least in part on whether the at least one message has been classified with a particular message classification.

10. The method of claim 7 further comprising:
generating, in response to a determination that the one or more support cases have been created, a communication identifying the creation; and
transmitting the communication to at least one user device.

11. The method of claim 7 further comprising:
generating, in response to a determination that the one or more support cases have been created, and that the one or more support cases have failed to be resolved, a communication identifying the failure; and
transmitting the communication to at least one user device.

12. The method of claim 6 further comprising:
receiving a notification that one or more support cases have been created to address the one or more performance issues; and
exposing an application programming interface to generate a status of the at least one message indicating that the one or more support cases have been created.

13. The method of claim 1 further comprising:
generating a unique identifier for the at least one message; and
storing the header portion in correspondence with the unique identifier in at least one data store.

14. The method of claim 1 further comprising:
designating one or more contacts for a particular message classification;

identifying whether the at least one message has been classified with the particular message classification; and
routing one or more communications corresponding to the at least one message to the one or more contacts.

15. An apparatus comprising:
a processing device operatively coupled to a memory and configured:
to receive at least one message, wherein the at least one message comprises a header portion, the header portion comprising operational information about at least one device, and the operational information characterizing one or more operating characteristics of the at least one device;
to classify the at least one message based at least in part on the header portion;
to route the at least one message to a communication channel of a plurality of communication channels based at least in part on the classifying;
responsive to the routing, to monitor for at least one of creation and resolution of one or more support cases to address one or more performance issues relating to the operational information of the header portion; and
to automatically generate and transmit at least one additional message in accordance with at least one configured escalation setting based at least in part on results of the monitoring.

16. The apparatus of claim 15 wherein:
the operational information identifies one or more performance issues with the at least one device; and
the processing device is further configured to determine whether one or more support cases have been created to address the one or more performance issues.

17. The apparatus of claim 16 wherein the processing device is further configured:
to generate, in response to a determination of a failure to create the one or more support cases, a communication identifying the failure; and
to transmit the communication to at least one user device.

18. An article of manufacture comprising a non-transitory processor-readable storage medium having stored therein program code of one or more software programs, wherein the program code when executed by at least one processing device causes said at least one processing device to perform the steps of:
receiving at least one message, wherein the at least one message comprises a header portion, the header portion comprising operational information about at least one device, and the operational information characterizing one or more operating characteristics of the at least one device;
classifying the at least one message based at least in part on the header portion;
routing the at least one message to a communication channel of a plurality of communication channels based at least in part on the classifying;
responsive to the routing, monitoring for at least one of creation and resolution of one or more support cases to address one or more performance issues relating to the operational information of the header portion; and
automatically generating and transmitting at least one additional message in accordance with at least one configured escalation setting based at least in part on results of the monitoring.

19. The article of manufacture of claim 18 wherein:
the operational information identifies one or more performance issues with the at least one device; and the program code further causes said at least one processing device to perform the step of determining whether one or more support cases have been created to address the one or more performance issues.

20. The article of manufacture of claim 19 wherein the program code further causes said at least one processing device perform the steps of:
generating, in response to a determination of a failure to create the one or more support cases, a communication identifying the failure; and
transmitting the communication to at least one user device.

\* \* \* \* \*